United States Patent

Sitbon et al.

[11] Patent Number: 5,822,563
[45] Date of Patent: Oct. 13, 1998

[54] PROCESS FOR SIMULATING A SERVER ARCHITECTURE FROM A CLIENT ARCHITECTURE

[75] Inventors: Gérard Sitbon, Vitry sur Seine; Jean-François Bassier, Sucy en Brie; Alev Aydin, Elancourt; Hubert Freund, Paris, all of France

[73] Assignee: Bull S.A., Louveciennes, France

[21] Appl. No.: 366,909

[22] Filed: Dec. 30, 1994

[30] Foreign Application Priority Data

Dec. 31, 1993 [FR] France .................................. 93 15957

[51] Int. Cl.⁶ ..................................................... G06F 13/00
[52] U.S. Cl. ............... 395/500; 395/200.33; 395/200.49; 395/684; 395/672; 707/3
[58] Field of Search ..................................... 395/500, 600, 395/650, 200.01, 200.03, 200.9, 200.16, 403, 404, 440, 200.18, 200.15, 474, 700, 821, 894, 726, 157, 603, 684, 200.33, 200.67, 672, 200.49; 370/85.13, 60, 94.1; 340/825.34; 364/578; 380/4; 379/59, 60, 90, 111, 112, 114, 115, 67, 88, 89, 93.29

[56] References Cited

U.S. PATENT DOCUMENTS

| | | | |
|---|---|---|---|
| 4,924,384 | 5/1990 | Hao et al. ................................. | 395/500 |
| 5,023,907 | 6/1991 | Johnson et al. ............................. | 380/4 |
| 5,247,676 | 9/1993 | Ozur et al. ................................ | 395/650 |
| 5,249,290 | 9/1993 | Heizer ..................................... | 395/650 |
| 5,249,293 | 9/1993 | Schreiber et al. ......................... | 395/650 |
| 5,285,494 | 2/1994 | Sprecher et al. ........................... | 379/59 |
| 5,301,280 | 4/1994 | Schwartz et al. ......................... | 395/325 |
| 5,301,316 | 4/1994 | Hamilton et al. ......................... | 395/600 |
| 5,307,490 | 4/1994 | Davidson et al. ......................... | 395/650 |
| 5,408,602 | 4/1995 | Giokas et al. ............................. | 395/500 |
| 5,442,749 | 8/1995 | Northcutt et al. ................... | 395/200.9 |
| 5,452,459 | 9/1995 | Drury et al. ............................. | 395/700 |
| 5,457,797 | 10/1995 | Butterworth et al. .................. | 395/650 |
| 5,463,625 | 10/1995 | Yasrebi .................................... | 395/650 |
| 5,497,463 | 3/1996 | Stein et al. .......................... | 395/200.03 |
| 5,499,379 | 3/1996 | Tanaka et al. ........................... | 395/700 |
| 5,544,320 | 8/1996 | Konrad ................................ | 395/200.09 |
| 5,574,854 | 11/1996 | Blake et al. ....................... | 395/183.04 |

OTHER PUBLICATIONS

Software—Practice and Experience, vol. 21, No. 1, Jan. 1991, Chichester, Sussex, GB, pp. 77–90, H.M. Levy et al. "Modules, Objects and Distributed Programming: Issues in RPC and Remote Object Invocation", p. 84, line 3—p. 85, line 2.

(List continued on next page.)

Primary Examiner—Jacques H. Louis-Jacques
Attorney, Agent, or Firm—Kerkam, Stowell, Kondracki & Clarke, P.C.; Edward J. Kondracki

[57] ABSTRACT

The invention relates to a process for simulating, in a network, a server architecture from a client architecture in a first machine (PS) for the execution of remote procedure calls (RPC sent by at least one machine with client architecture (CL). In this this process, the first machine (PS) initially sends an RPC call to a third machine with server architecture (RE) which is used as a relay machine between the first (PS) and the second (CL) machines, and this RPC call opens a communication context for the sequence of exchanges while the first machine (PS) blocks itself on standby for a return of the RPC call. When the second machine (CL) sends an RPC call which represents a predetermined function to be executed by the first machine (PS), this call is transmitted to the relay machine (RE) which, after recognizing the function, retransmits it to the first machine (PS) through a return of the blocked RPC call. The first machine (PS) then requests the input parameters of the function to be executed, which are known to the relay machine (RE), then executes the function upon their reception by furnishing the result as an output parameter to the second machine (CL) via the relay machine (RE).

12 Claims, 2 Drawing Sheets

OTHER PUBLICATIONS

COMPSAC '87: Proceedings of the Eleventh Annual Internat'l Computer Software and Applications Conference, 9 Oct. 1987, Tokyo, JP, pp. 687–693, K.B. Sheets et al., "A Kernel Level Remote Procedure Call Mechanism", p. 688, left hand column, line 33—right hand column, line 10.

Rege: A distributed system client/server architecture for interactive multimedia applications, IEEE, Jan. 1996.

Khandker et al: Performance of DCE RPC, IEEE, Apr. 1995.

Lin et al: A asynchronous remote procedure call system for heterogeneous programming, IEEE, May 1991.

Olsen et al: A model for interface groups, IEEE, Mar. 1991.

Zhang et al: Organization modeling using virtual agents and virtual communities, IEEE, Aug. 1992.

Decouchant et al: Remote execution and communication in Guide—an object–oriented distributed system, IEEE, Jun. 1990.

Yuasa et al: Network programming support with object–oriented paradigm, IEEE, Jul. 1993.

PROCESS FOR SIMULATING A SERVER ARCHITECTURE FROM A CLIENT ARCHITECTURE

FIELD OF THE INVENTION

The present invention relates to a process for simulating a server architecture, in a network, from a client architecture in a first machine for the execution of RPCs (remote procedure calls) sent by at least one second machine with a client architecture.

BACKGROUND OF THE INVENTION

Generally, the remote procedure call (RPC) service furnishes a high-level language and allows programs executed locally to call up procedures installed in remote systems. This service constitutes a fundamental element of the client-server model. This model is an asymmetrical data processing model constituted by two separate units and logics working in cooperation. A machine with client architecture, commonly called a client, requests information or actions which a machine with server architecture can execute more specifically or under better conditions. The machine with server architecture, commonly called a server, responds to the requests from the client and executes cumbersome or specialized tasks.

The need for using a machine with an exclusively client architecture as a server may be felt in this context. Until now, the solution to this problem consisted of porting a server part to the client machine, that is to say reproducing the entire source code of a server part. Such a solution is time-consuming and tedious and consequently costly, all the more so because several versions can follow close on one another, and also because the code can be difficult to port to proprietary systems.

SUMMARY OF THE INVENTION

The object of the present invention is to remedy the above mentioned disadvantages and to propose a process for simulating a server architecture from a client architecture which does not necessitate recopying a server part and which consequently is less burdensome and faster to implement.

For this purpose, the simulation process mentioned in the preamble is remarkable in that the first machine initially sends an RPC call to a third machine with server architecture which is used between the first and the second machines and is therefore called a relay machine, this RPC call opening a communication context (called a client context by one skilled in the art working in a distributed information environment) and according to the semantics of DCE, DCE (for Distributed Computing Environment) being a trademark registered by Open Software Foundation) for the sequence of exchanges while the first machine blocks itself onto this call on standby for its return, then when the second machine sends an RPC call representing a predetermined function to be executed by the first machine, this call is transmitted to the relay machine, which after recognizing the function to be executed retransmits it to the first machine through a return of the blocked RPC call, the first machine then requesting the input parameters of the function to be executed which are present in the relay machine, then executing this function after reception of these input parameters and finally furnishing the result as an output parameter to the second machine via the relay machine.

Thus, as a result of the simulation process according to the invention, in a network, a client machine can initiate RPC procedure calls to another client machine used as a server (pseudo-server), without modification or recopying of the source code of a server part; the client code is standard, and for this purpose, it is sufficient to select a server from the network which will then serve as a relay machine and will authorize the dialogue between the client machine and the pseudo-server. In effect, the client machine then sees the server/pseudo-server pair as a homogeneous server machine. Under these conditions, any RPC call with any type of parameter can be executed. Furthermore, the interface of the procedure is generally described in am interface description language (IDL). This interface is compiled in two stubs (as they are known to one skilled in the art), one for the client side, the other for the server side of the RPC, the stubs being compiled with the client and server programs respectively in order to produce the two executables, client and server. The client stub is a function whose interface complies with the interface described in IDL and whose object is to transform the call parameters of the representation specific to the client machine into a universal representation, called a network representation. The object of the server stub is to transform the call parameters of the network representation into the representation specific to the server machine and then to call the function that has actually been requested. According to the invention, the functioning is automatic and in conformity with the network representation, with all the conversions being effected at the NDR (Network Data Representation) level. The stubs, which are generated by the interface description language, are therefore standard. Moreover, as far as backup services are concerned, the optional protection mechanisms are also standard.

Remarkably, according to the present simulation process, the following steps are done chronologically:

the first machine sends a first execution unit of the relay machine an RPC call (1) signifying that it is ready for the execution of functions; the execution unit of the relay machine which manages this RPC call (1) puts itself on standby for a wake-up signal and thus blocks the first machine to this RPC function (1), the relay machine informs the naming service that the first machine is ready to execute a desired function, the second machine will search in a directory of the naming service for the address of the function to be executed, the second machine then sends an RPC call (2), which is in conformity with the network representation, which corresponds to the function to be executed and which includes the input and output parameters of this function, to a second execution unit in the relay machine; this execution unit puts itself on standby for a wake-up signal and thus blocks the second machine to this RPC call (2) after having itself sent a wake-up signal to the first execution unit on standby, the first machine is informed, through the return of the RPC call (1) deblocked in this way, of the type of function to be executed, the first machine sends a new RPC call (3) to the first execution unit in the relay machine, in order to request the input parameters of the function to be executed; this execution unit requests these parameters from the second execution unit in the relay machine via an interprocess communication mechanism ("sockets," shared memory with semaphores, message files, communication tube or "pipe" . . .) or an intraprocess communication mechanism (global memory protected by locks, for example).

after obtaining the input parameters of the function to be executed, the first execution unit of the relay machine transmits these parameters through a return of the RPC call (3) to the first machine, which executes the function, the first machine transmits the result of the executed function to the first execution unit of the relay machine which in the first place communicates it to the second execution unit via an interprocess communication mechanism ("sockets," shared memory with semaphores, message files, communication tube or "pipe" . . .) or an intraprocess communication mechanism (global memory protected by locks, for example) and in the second place sends a wake-up signal to this second execution unit, the second execution unit in the relay machine, through a return of the RPC call (2) deblocked in this way, transmits the result of the executed function to the second machine as an output parameter.

In this way, the process according to the invention can obviously be applied to a plurality of client machines sending RPC calls to a pseudo-server; each client machine sees the server/pseudo-server pair as a server machine. The dialogue between the client machine and the pseudo-server is therefore authorized through the medium of different execution units in the relay machine.

BRIEF DESCRIPTION OF THE DRAWINGS

The following description with regard to the appended drawings, all of which is given as a non-limiting example, will make it better understood how the invention may be implemented.

DECRIPTION OF THE PREFERRED EMBODIMENTS

Figure 1:
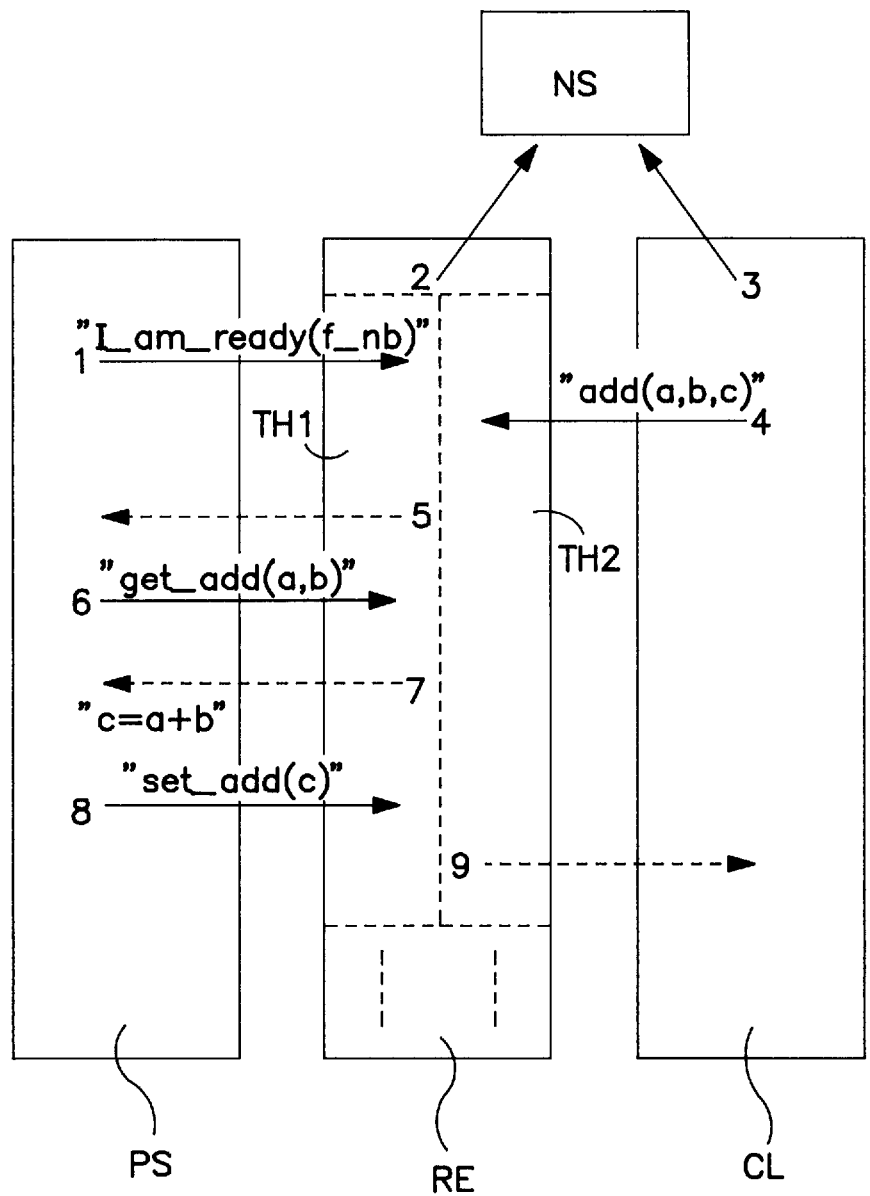
FIG. 1 presents, in a schematic way, an example of dialogue processed in a network around RPC calls, between a first client machine used as a server and a second client machine through the medium of a third server machine used as a relay.
Figure 2:
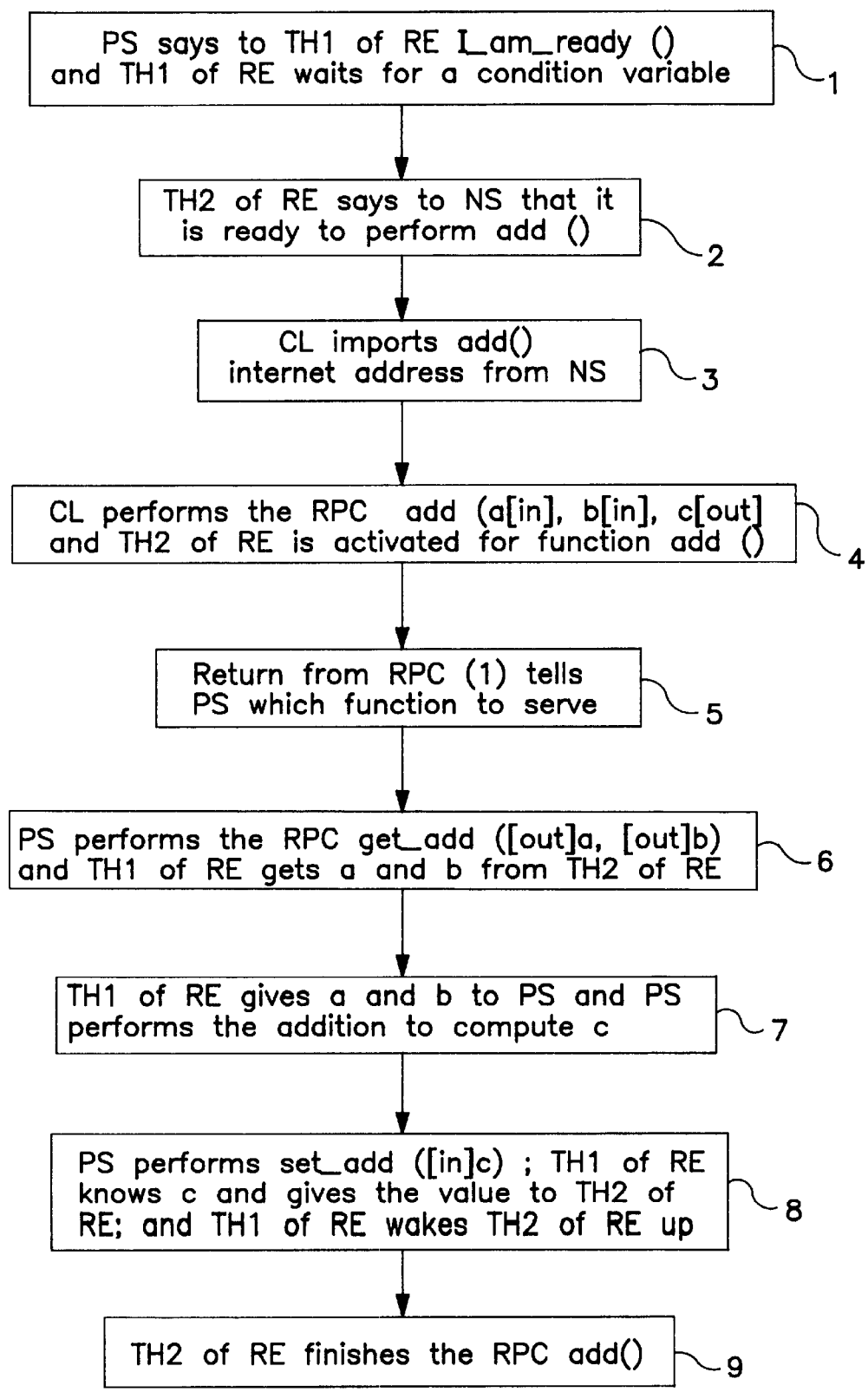
FIG. 2 is a flowchart generally showing the steps performed in accordance with the present invention.

As indicated in the figures, a first machine PS with client architecture only is desired to be used as an RPC server (pseudo-server) by a second machine CL with client architecture. In accordance with the idea of the invention, the different RPC calls are at first sent to a third machine RE called a relay machine, which has a server architecture.

Preferably, the machines PS, RE, CL are machines of the DCE type (DCE is a trademark registered by Open Software Foundation).

Likewise, in a manner that is preferred but non-limiting, the remote procedure calls are of the standard DCE/RPC type. It is recalled, however, that any type of RPC call with any other type of parameter can advantageously be used in accordance with the present process, for example an RPC according to the technology of Sun Microsystems, an Apollo/Hewlett-Packard NCS 1.5 RPC (NCS: Network Computing System), an RPC per Netwise etc.

For a better understanding of the process according to the invention, a simple example is described below. In this example, the machine CL requests the machine PS to execute an addition function, using the parameters a and b to be added as input parameters, and the parameter c representing the result of the addition of a and b as an output parameter.

In this very example, according to the present simulation process, different steps will be followed before it culminates in the result c.

Thus, in step 1, the first machine PS sends a call RPC 1 (represented by an arrow with a solid line), for example of the "I_am_ready(f_nb)" type, to a first execution unit TH1 in the relay machine RE, signifying that it is ready for the execution of functions (including the "add" function). The execution unit TH1 in the machine RE that receives and will therefore manage this call RPC 1 then puts itself on standby for a wake-up signal, which can be a condition variable of the (pthread_cond_wait_(cond_var_work)) type, the effect of which is to block the first machine PS to the call RPC 1.

During a second step 2, the relay machine RE informs the naming service NS that the first machine PS is ready to execute the function desired by the second machine CL, which in this case will be the addition function "add." In the figure, the naming service NS is represented outside the machines PS, RE or CL, however it can be located in any one of the server machines in the network, and therefore, for example, in RE.

During step 3, the second machine CL will search in a directory of the naming service, commonly called CDSD (Cell Directory Server Daemon) for the address (for example an Internet address) of the function to be executed, in the present case the "add" function.

During step 4, the second machine CL in turn sends a call RPC 2 (represented by an arrow with a solid line), which is in conformity with the network representation due to the standard stubs, to a second execution unit TH2 in the machine RE; this call corresponds to the function to be executed and includes the input parameters (a, b) and the output parameter (c) of this function. The call RPC 2 can be of the "add" ("a[in], b[in], c[out]") type, for example. The execution unit TH2 sends the wake-up signal awaited by the first machine PS (pthread_cond_signal_(cond_var_work)), then places itself on standby for a wake-up signal which can be a condition variable of the (pthread_cond_wait (cond_var_arg)) type, the effect of which is to block the second machine CL to the call RPC 2.

During step 5, the first machine PS is informed of the type of function to be executed through a return of the call RPC 1 (represented by an arrow with a dotted line) released in this way, the number of the function, here corresponding to the "add" function, having been transmitted to it. It is during this step, therefore, that the machine PS knows which function must be executed, in this case the "add" function, and even what type of parameters to request.

In step 6, the first machine PS sends a new call RPC 3 (represented by an arrow with a solid line), for example of the "get_add ([out]a,[out]b)" type, to the execution unit TH1 in the machine RE, in order to request the input parameters (a,b) of the "add" function to be executed. The execution unit TH1 then requests these parameters from the second execution unit TH2 and obtains them via an interprocess communication mechanism of the type that includes "sockets," shared memory with semaphores, message files, communication tubes or "pipes. . .", or an intraprocess communication mechanism, for example of the type that includes global memory protected by locks.

When the execution unit TH1 in the machine RE has obtained the input parameters (a,b) of the "add" function to be executed, it transmits these parameters (a,b) to the first machine PS during step 7, through a return of the call RPC 3 (represented by an arrow with a dotted line). The machine PS now knows the "add" function to be executed and the input parameters a and b, and it executes the addition of a and b in order to produce the result c=a+b.

During step 8, the first machine PS transmits the result c of the function executed in this way to the execution unit TH1 of the machine RE, by means of, for example, the function "set_add ([in]c). The execution unit TH1, which know knows the result c, communicates it to the execution unit TH2 via an interprocess communication mechanism ("sockets," shared memory with semaphores, message files, communication tube or "pipe. . ."), or an intraprocess communication mechanism (global memory protected by locks, for example, then sends the awaited wake-up signal of the (pthread_cond_signal(cond_var_arg)) type to this unit TH2, which will have the effect of releasing the call RPC 2.

Finally, during step 9, the second execution unit TH2 in the machine RE, through a return of the call RPC 2 (represented by an arrow with a dotted line) released in this way, transmits the result c=a+b of the executed "add" function to the second machine CL as an output parameter.

In conclusion, as has just been seen, the present process, which makes it advantageously possible to simulate a server architecture from a client architecture, can be implemented easily and rapidly, and consequently its application is not very burdensome.

While the preferred forms and embodiments of the invention have been illustrated and described, it will be apparent to those of ordinary skill in the art that various changes and modifications may be made without deviating from the inventive concepts and spirit of the invention as set forth above, and it is intended by the appended claims to define all such concepts which come within the full scope and true spirit of the invention.

We claim:

1. A process for simulating, in a network, a server architecture from a client architecture in a first machine for the execution of remote procedure calls (RPC) sent by at least one second machine with client architecture, wherein the first machine initially sends an RPC call to a relay machine with server architecture which is used between the first and the second machines, said RPC call opening a communication context for a sequence of exchanges while said first machine blocks itself on said call on standby for its return, then when the second machine sends an RPC call which represents a predetermined function to be executed by the first machine, transmitting said RPC call to the relay machine, which after recognizing the function to be executed retransmits it to the first machine through a return of the blocked RPC call, the first machine then requesting the input parameters of the function to be executed which are present in the relay machine, then executing said function after receiving said input parameters, and finally furnishing the result as an output parameter to the second machine via the relay machine.

2. The simulation process according to claim 1, in which the machines are of the DCE type.

3. The simulation process according to claim 2, in which the remote procedure calls are of the standard DCE/RPC type.

4. The simulation process according to claim 2, in which any type of remote procedure call (RPC) is used for the communications between machines.

5. The simulation process according to claim 1, in which the remote procedure calls are of the standard DCE/RPC type.

6. The simulation process according to claim 1, in which any type of remote procedure call (RPC) is used for the communications between machines.

7. A process for simulating, in a network, a server architecture in a first machine for the execution of remote procedure calls (RPC) sent by at least one second machine with client architecture, comprising sending an RPC call from the first machine to a first execution unit of a third machine, defined as a relay machine, with server architecture which is used between the first and second machines, said RPC call opening a communication context for a sequence of exchanges while said first machine blocks itself on said call on standby for its return, searching by the second machine in a directory of a naming service for the address of the function to be executed, then, when the second machine sends an RPC call which represents a predetermined function to be executed by the first machine to a second execution unit in the relay machine, said second execution unit puts itself on standby for a wake-up signal and blocks the second machine to said RPC call (2) after having sent a wake-up signal to the first execution unit on standby, transmitting said call to the relay machine which, after recognizing the function to be executed, re-transmits said call to the first machine through a return of the blocked RPC call, then sending a RPC call from the first machine to the first execution unit in the relay machine via an interprocess to request input parameters of the function to be executed which are present in the second execution unit of the relay machine, then executing said function to be executed after receiving said input parameters, and finally furnishing the result as an output parameter to the second machine via the execution unit in the relay machine.

8. The simulation process according to claim 7, in which the machines are of the DCE type.

9. The simulation process according to claim 8, in which the remote procedure calls are of the standard DCE/RPC type.

10. The simulation process according to claim 8, in which any type of remote procedure call (RPC) is used for the communications between machines.

11. The simulation process according to claim 7, in which the remote procedure calls are of the standard DCE/RPC type.

12. The simulation process according to claim 11, in which any type of remote procedure call (RPC) is used for the communications between machines.

* * * * *